United States Patent [19]

Hardwick

[11] Patent Number: 5,305,302
[45] Date of Patent: Apr. 19, 1994

[54] TRACK FORMAT AND RECORD CARRIER SYSTEM FOR SPLIT DATA FIELD SUPPORT

[75] Inventor: Andrew C. Hardwick, Boulder, Colo.

[73] Assignee: Conner Peripherals, Inc., San Jose, Calif.

[21] Appl. No.: 105,530

[22] Filed: Aug. 12, 1993

Related U.S. Application Data

[63] Continuation of Ser. No. 621,996, Dec. 4, 1990, abandoned.

[51] Int. Cl.$^5$ .............................................. G11B 5/596
[52] U.S. Cl. .................... 369/275.3; 369/44.26; 360/75; 360/77.05; 360/77.08
[58] Field of Search ............... 369/275.3, 44.26, 44.28, 369/109; 360/77.05, 77.08, 73.03, 135, 48

[56] References Cited

U.S. PATENT DOCUMENTS

| | | | |
|---|---|---|---|
| 4,016,603 | 4/1977 | Ottesen | 360/135 |
| 4,068,269 | 1/1978 | Commander et al. | 360/78 |
| 4,134,138 | 1/1979 | Cardot et al. | 360/39 |
| 4,135,217 | 1/1979 | Jacques et al. | 360/77 |
| 4,238,809 | 12/1980 | Fujiki et al. | 360/131 |
| 4,485,337 | 11/1984 | Sandusky | 318/314 |
| 4,488,187 | 12/1984 | Alaimo | 360/77 |
| 4,516,162 | 5/1985 | West | 360/77.08 |
| 4,530,019 | 7/1985 | Penniman | 360/77 |
| 4,530,020 | 7/1985 | Sutton | 360/77 |
| 4,589,037 | 5/1986 | Jen et al. | 360/77.08 |
| 4,602,304 | 7/1986 | Fultz | 360/77 |
| 4,630,140 | 12/1986 | Sugimura et al. | 360/49 |
| 4,631,606 | 12/1986 | Sugaya | 360/78 |
| 4,656,532 | 4/1987 | Greenburg et al. | 360/48 |
| 4,669,004 | 5/1987 | Moon et al. | 360/77 |
| 4,688,119 | 8/1987 | Blessum | 360/77 |
| 4,714,967 | 12/1987 | Bizjak | 360/48 |
| 4,811,124 | 3/1989 | Dujari et al. | 360/49 |
| 4,823,212 | 4/1989 | Knowles et al. | 360/77.08 |
| 4,841,393 | 6/1989 | MacLeod et al. | 360/98.07 |
| 4,841,498 | 6/1989 | Sugimura et al. | 369/32 |
| 4,858,034 | 8/1989 | Hassel et al. | 360/51 |
| 4,864,443 | 9/1989 | Peterson | 360/99.12 |
| 4,910,617 | 3/1990 | Brunnett et al. | 360/78.14 |
| 4,912,576 | 3/1990 | Janz | 360/77.08 |
| 4,933,786 | 6/1990 | Wilson | 360/78.14 |
| 5,021,898 | 6/1991 | Sakai et al. | 360/77.08 |
| 5,050,016 | 9/1991 | Squires | 360/77.08 |
| 5,059,393 | 10/1991 | Janz | 360/77.05 |
| 5,064,377 | 11/1991 | Wood | 439/67 |
| 5,121,262 | 9/1992 | Squires et al. | 360/46 |
| 5,170,385 | 12/1992 | Senshu et al. | 369/275.4 |
| 5,210,660 | 5/1993 | Hetzler | 360/51 |

FOREIGN PATENT DOCUMENTS

| | | |
|---|---|---|
| 0278006 | 8/1988 | European Pat. Off. |
| 62-3475 | 1/1987 | Japan |
| 1-19567 | 1/1989 | Japan |
| 1-154376 | 6/1989 | Japan |

OTHER PUBLICATIONS

Smith, Brett, "Servo Zones Embedded In Data Tracks Solve Old, But Create New Problems", Computer Technology Review, Spring 1988, pp. 45-46, 48.

*Primary Examiner*—Paul M. Dzierzynski
*Assistant Examiner*—Kim-Kwak Chu
*Attorney, Agent, or Firm*—Fliesler, Dubb, Meyer & Lovejoy

[57] ABSTRACT

The invention provides a track format and a record carrier system for supporting a track architecture where a first field, such as a data field, is split by a second field, like a servo field. The preferred track format includes a split count field that contains information on the location of the second field with respect to the first field. In the preferred embodiment, the split count field is located in the header associated with the data field. The present invention also includes circuitry that reads the split count and uses the split count to discriminate the first field from the second field or the information contained in the first field from the information contained the second field. The invention is particularly useful in modified constant angular velocity (MCAV) magnetic disk systems where constant frequency servo fields are embedded among variable frequency data fields. The present invention is, however, applicable to any kind of record carrier where one field is split by another field. For instance, the invention can be used with constant linear velocity (CLV) and constant angular velocity (CAV) data storage systems. Moreover, the invention can be used with different types of recording media, such as magnetic media and optical media.

5 Claims, 4 Drawing Sheets

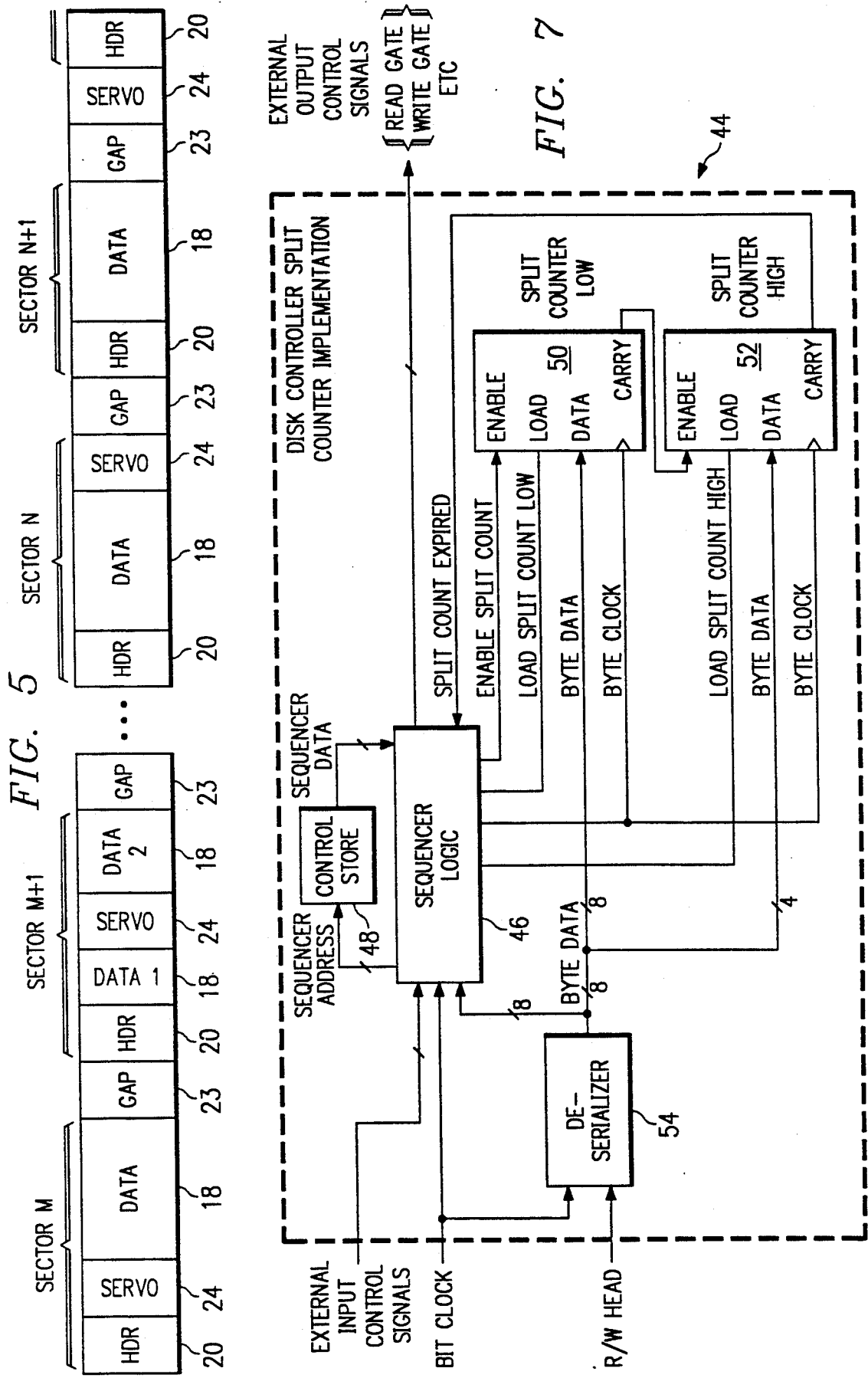

TRACK FORMAT AND RECORD CARRIER SYSTEM FOR SPLIT DATA FIELD SUPPORT

This application is a continuation of Ser. No. 07/621,996, filed Dec. 4, 1993, now abandoned.

BACKGROUND OF THE INVENTION

1. Field of the Invention

The present invention relates to a track format and record carrier system for use in transferring information to or from a first field on the track that is split by a second field where it is necessary to distinguish the first field from the second field or the information in the first field from the information in the second field.

2. Description of the Related Art

With reference to FIGS. 1A and 1B, a disk record carrier 10 includes a plurality of concentric tracks 12 that are located on one or both sides of the disk record carrier 10. Alternatively, a spiral track can be employed on one or both sides of the disk record carrier 10. Information, in the form of bits 14, are generally established on the tracks in one of two ways. In the first way, bits 14 are established on the tracks 12, as shown in FIG. 1A, at a density per unit length of track that decreases with increasing track radius. Generally, the density varies such that each track 12 has a substantially equal number of bits 14. In the second way, bits 14 are established on the tracks 12 at a density that remains substantially constant with increasing track radius as shown in FIG. 1B. This results in an increasing number of bits 14 per unit length of track as the track radius increases.

With reference to FIGS. 2A and 2B, the bits 14 of information established on the tracks 12 are typically grouped into eight bit units known as bytes 16. A defined number of bytes 16, typically a number that is a power of two, are grouped into a data field 18. In the case where the bits 14 are established on the tracks 12 at a density that decreases with increasing track radius, each track 12 also has an equal number of data fields 18, as shown in FIG. 2A. On the other hand, where the bits 14 are established on the tracks 12 at a density the remains substantially constant from track to track, as shown in FIG. 2B, the number of data fields 18 per track 12 increases with increasing track radius. Associated with each data field 18 is a header 20 that contains information that uniquely identifies the data field 18 and the header 20, the combination of which is hereinafter referred to as a sector 22, with respect to every other sector 22 on the disk record carrier 10. Typically, the information used to identify a particularly sector 22 is the location of the sector 22 on the disk record carrier 10, i.e., the track 12 on which the sector 22 is located and the number of the sector 22 on the track 12. Sectors are typically separated from one another by gaps 23 that insure equal spacing between sectors 22 on a particular track by providing space that can be used to accommodate any overflow in the nominal length of the sector 22 due to deviations in byte length and the like.

Presently, the rotation of disk record carriers is controlled such that a defined point on a track moves at a constant linear velocity (CLV) relative to a read/write (R/W) head or at a constant angular velocity (CAV) where a defined point on a track moves at an increasing linear velocity relative to the R/W head as the radius of the track increases. To transfer information between the disk record carrier and the R/W head at a constant frequency, CLV disk systems establish bits of information on the tracks at a density that remains substantially constant as the track radius increases, as shown in FIG. 1B. In contrast, CAV disk systems establish bits of information on the tracks at a density that decreases as the track radius increases to achieve a constant frequency of information transfer to or from the disk record carrier. Since the bits of information are transferred to or from the disk recording media at a substantially constant frequency in both CLV and CAV disk systems, bytes, data fields, headers, and sectors of information are also transferred between the disk record carrier and the R/W head at a substantially constant frequency.

Recently, disk record carrier systems have been developed where the disk recording media is rotated at a constant angular velocity and the bits of information are established on the tracks at a density that remains substantially constant as the track radius increases. In this type of system, known as a modified constant angular velocity (MCAV) system, information is transferred between the disk recording media and the R/W head at a frequency that increases as the track radius increases. Since bits of information are transferred to or from the disk recording media at a frequency that increases with increasing track radius, bytes, data fields, headers, and sectors of information are also transferred between the disk record carrier and the R/W head at a frequency that increases with increasing track radius.

In addition to including areas for recording user data and identifying the location of a sector, disk record carriers also include servo fields that provide information to one or more servo loops, which typically use the information to control the positioning of the R/W head with respect to the disk record carrier. In large disk systems that include a plurality of disks journaled to a common spindle, one side of one of the disks is typically dedicated to providing the servo information that is used to control the position of the R/W heads associated with the recording surfaces of the other disks. A drawback associated with using an entire surface of a disk to provide servo information is that as the number of the disk recording media on the spindle decreases an increasing portion of the available recording surface becomes dedicated to providing servo information and a decreasing portion is available to store user data. Consequently, in disk systems that have a relatively small number of disk record carriers on a spindle, discrete servo fields have been located on the same recording surface as the data fields. To facilitate the design of the servo loops, among other things, the servo fields are typically established at locations on the tracks such that the servo fields are encountered at a substantially constant frequency. For example, in the case of a CAV disk system, the servo fields are located on each track at an angular interval that remains substantially constant from track to track.

With reference to FIG. 3, a MCAV disk system has been proposed that will utilize a constant frequency servo field 24. The use of a constant frequency servo field 24 with the data fields 18 and/or sectors 22 that are detected by the R/W head at a frequency that increases with increasing track radius results in most, if not all, of the data fields 18 being split by a servo field 24, i.e., a servo field 24 becomes part of the sector 22. Moreover, the location of the servo fields 24 with respect to the beginning or end of the data fields 18 varies in a substantially random fashion from sector to sector. To avoid reading servo data as user data or user data as servo data, the information in the data fields 18 and must be distinguished from the information in the servo fields 24. Similarly, in the case of write operations, the data fields 18 must be distinguished from the servo fields 24 to avoid writing user data in the servo fields 24 or servo data in the data fields 18. One way to discriminate between a data field 18 and a servo field 24 is to provide information on the location of the servo field 24 with respect to a known point in the data field 18. One way to accomplish this is to use a processor that calculates or looks-up in a memory device the number of bytes in the data field 18 that precede or follow the servo field 24, hereinafter referred to as the split count, and provide the split count to a disk controller, which controls the transfer of information to or from the disk record carrier. A major drawback associated with using a processor to determine the split count is that the disk controller must request the split count for each sector to or from which information is to be transferred. Unfortunately, as the frequency at which information is transferred to or from the sectors increases with increasing track radius in the MCAV disk system, the ability of the processor to provide the disk controller with the split count decreases and eventually reaches a point where the processor cannot provide the disk controller with the split count in time for the disk controller to properly transfer the data to or from the disk. Since one of the advantages of using a MCAV disk system is that information can be transferred to or from the disk recording media with increasing frequency as the radius of the tracks increases, the use of a processor to supply the split count adversely affects this advantage.

Based on the foregoing, there is a need for a track format and record carrier system that supports a track format where one field is split by another field and it is necessary to distinguish the first field from the second field or the information in the first field from the information in the second field. Moreover, there is a need for such a track format and record carrier system where the drawbacks associated with using a processor or other device to determine the split count and provide the split count to a disk controller are reduced or substantially eliminated. More specifically, there is a need for a track format and record carrier system for use in distinguishing servo fields from data fields in MCAV disk systems that employs a constant frequency servo field.

SUMMARY OF THE INVENTION

The present invention provides a track format and record carrier system for use with a track format where a first field is split by a second field and it is necessary to distinguish the fields or the data contained in the fields from one another. The track format includes a portion that contains information that is used to determine the location of the second field with respect to a defined point on the record carrier. The invention also includes a device for reading the aforementioned information and using the information to control the reading or writing of data to or from the track. With respect to reading information from the track, the device uses the information to ensure that the data in the second field is not mistaken or identified as data from the first field. With respect to writing information on the track, the device uses the information to ensure that the second field is not corrupted with data that belongs in the first field.

In a preferred embodiment of the invention where one or more data fields on a disk are split by at least one servo field, the header portion of the sectors on the disk where a data field is split count by a servo field include a split count field that contains information relating to the number of bytes in the data field that precede or follow the servo field that splits the data field. The aforementioned device uses this information during read operations to separate the information in the servo field from the information in the data field and during write operations to prevent user data from being written into the servo field and thereby corrupting the information already contained in the servo field.

The present invention is especially useful in MCAV disk systems where a constant frequency servo field is employed because the split count field information, which is preferably located in the header portion that precedes the data field, can be provided in a sufficient amount of time to accomplish the transfer of information to or from the disk. More specifically, by providing the split count field information in the header of each sector, the information necessary to transfer information to or from the data field or the servo field in a sector is provided at substantially the same frequency as the data fields or servo fields are encountered by the R/W head. Consequently, the ability to transfer information to or from the disk is substantially improved relative to systems where a processor is employed to calculate or look-up the split count and provide the split count to the disk controller.

While the present invention is particularly useful with MCAV disk systems that employ a constant frequency servo, the present invention can also be utilized with any other type of record carrier system where one field is split by another field. For example, the present invention can be utilized with a CAV disk system, a CLV disk system, and a CLV tape or drum data storage system. Moreover, the present invention can be used with different types of recording media, such as magnetic media or optical media.

BRIEF DESCRIPTION OF THE DRAWINGS

FIG. 5 illustrates the various places on a track where a constant frequency servo field can be located relative to a variable frequency data field;

FIG. 7 is a circuit block diagram of the disk controller illustrated in FIG. 6.

DETAILED DESCRIPTION OF A PREFERRED EMBODIMENT

The present invention provides a track format and record carrier system for supporting a track architecture where one field is split by another field and it is necessary to distinguish the fields or the information that they contain from one another. The track format of the present invention includes a portion that contains information that can be used to distinguish the fields or the information they contain from one another. In one embodiment of the invention, the information specifies the number of bytes in the first field that precede or follow the second field that splits the first field. Another embodiment of the invention also includes a device that uses the aforementioned information to distinguish the fields from one another in the case of write operations or, or in the case of read operations, to distinguish the information contained in the fields.

Figure 1A:
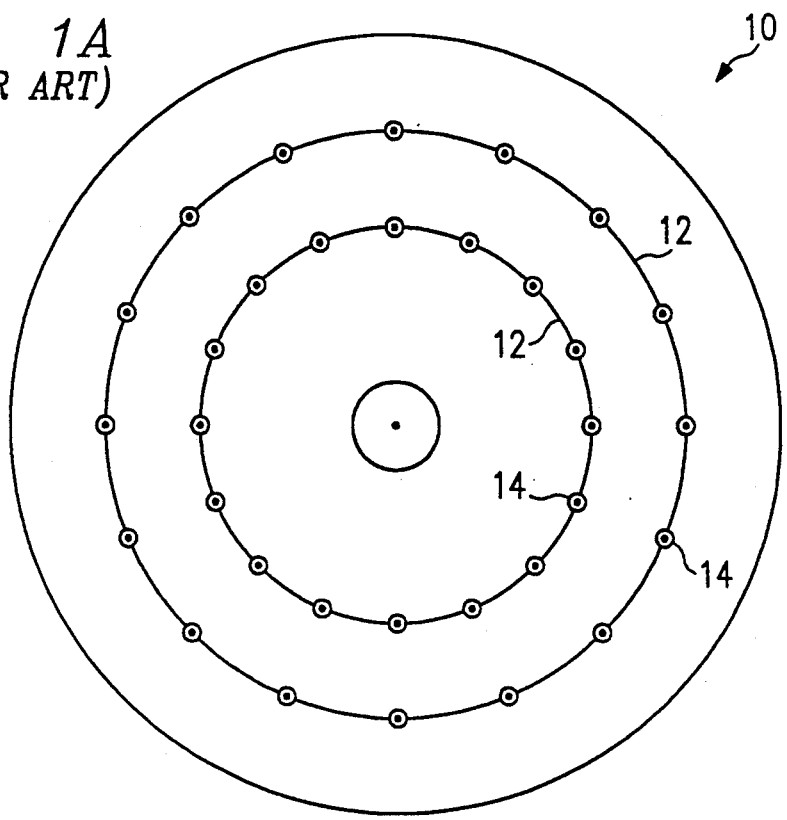
FIG. 1A illustrates a disk record carrier where the bit density decreases as the track radius increases.
Figure 1B:
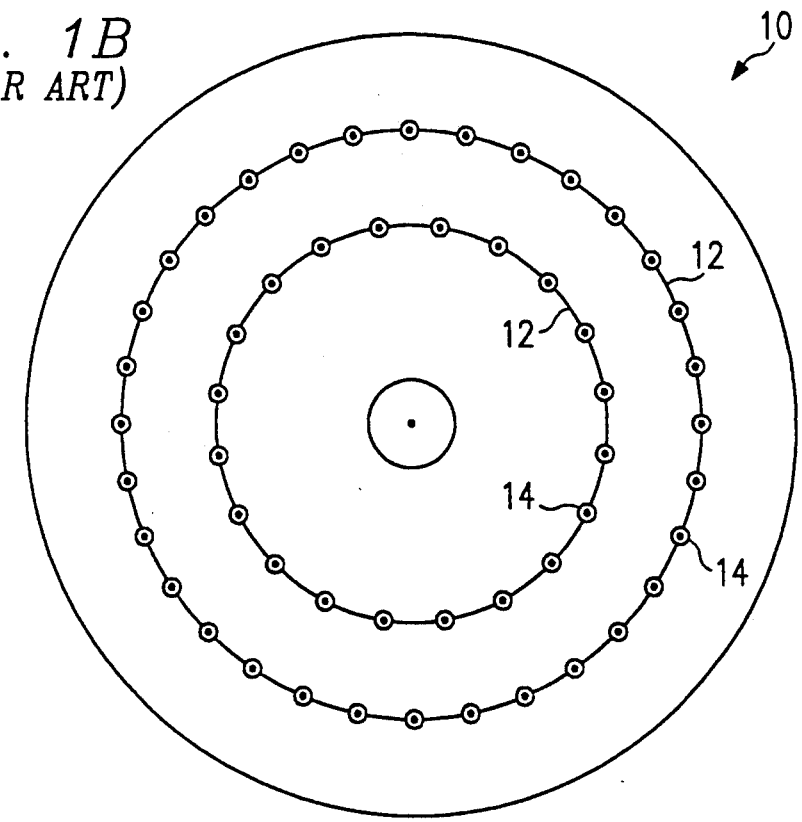
FIG. 1B illustrates a disk record carrier where the bit density remains substantially constant as the track radius increases.
Figure 2A:
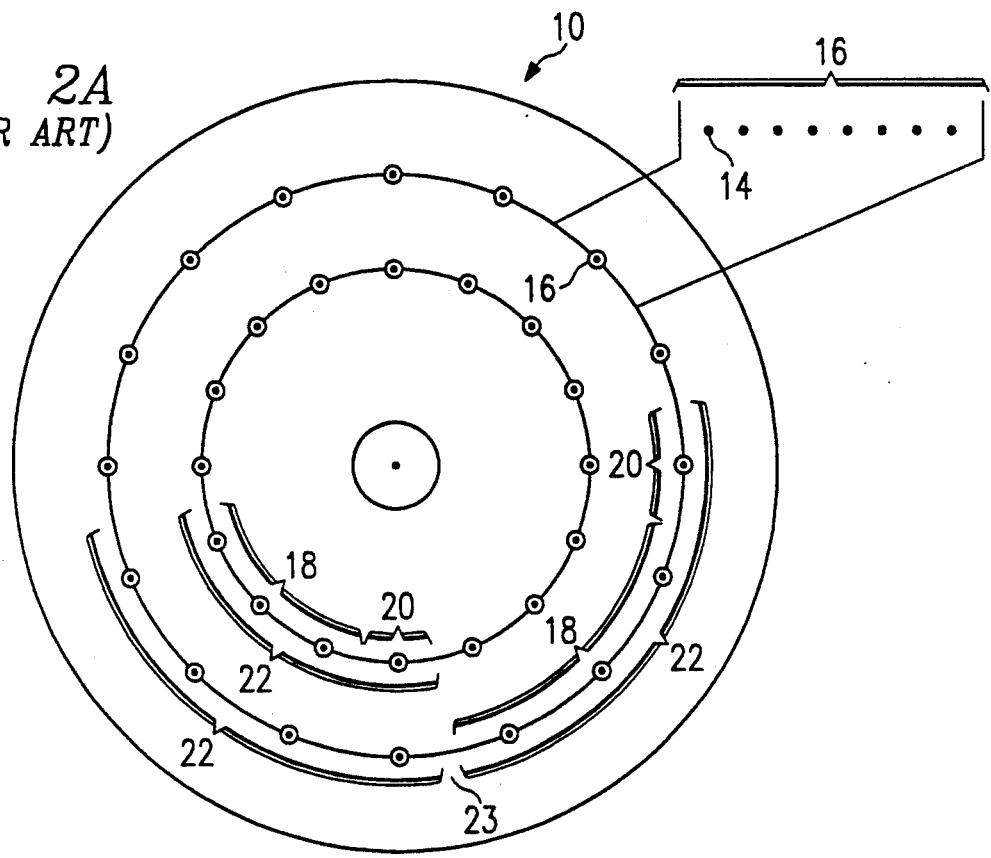
FIG. 2A illustrates a disk record carrier where the sector density decreases as the track radius increases.
Figure 2B:
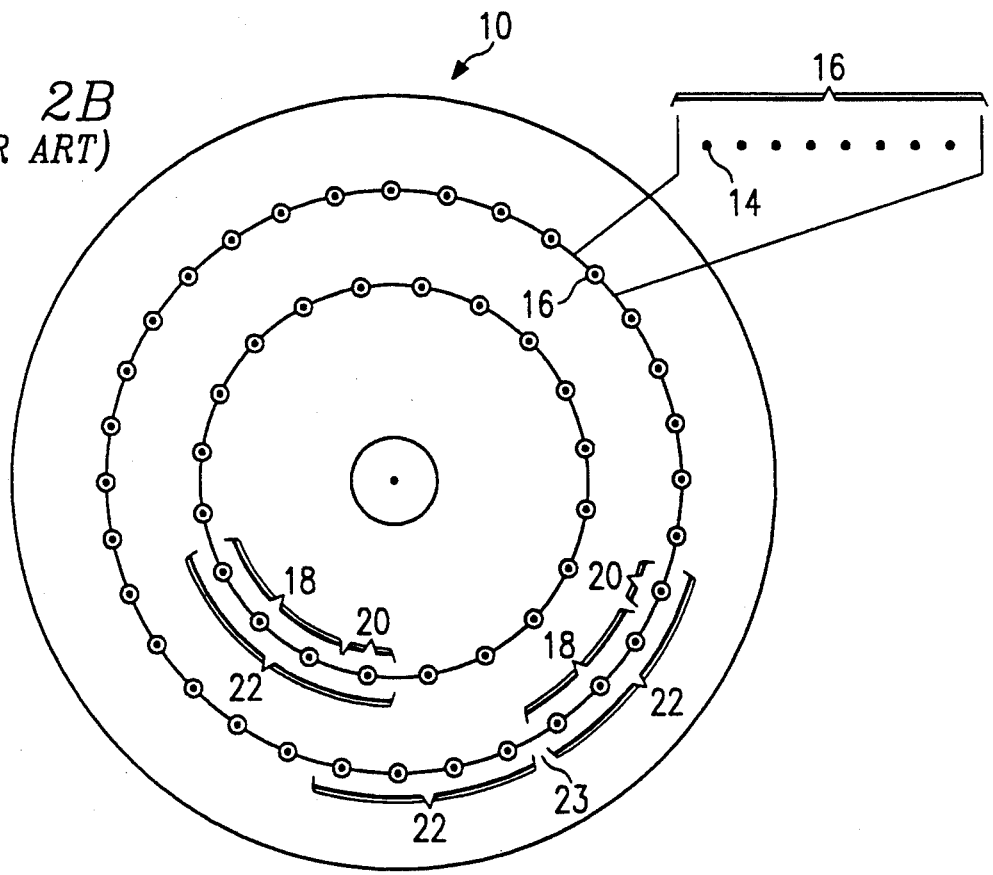
FIG. 2B illustrates a disk record carrier where the sector density remains substantially constant as the track radius increases.
Figure 3:
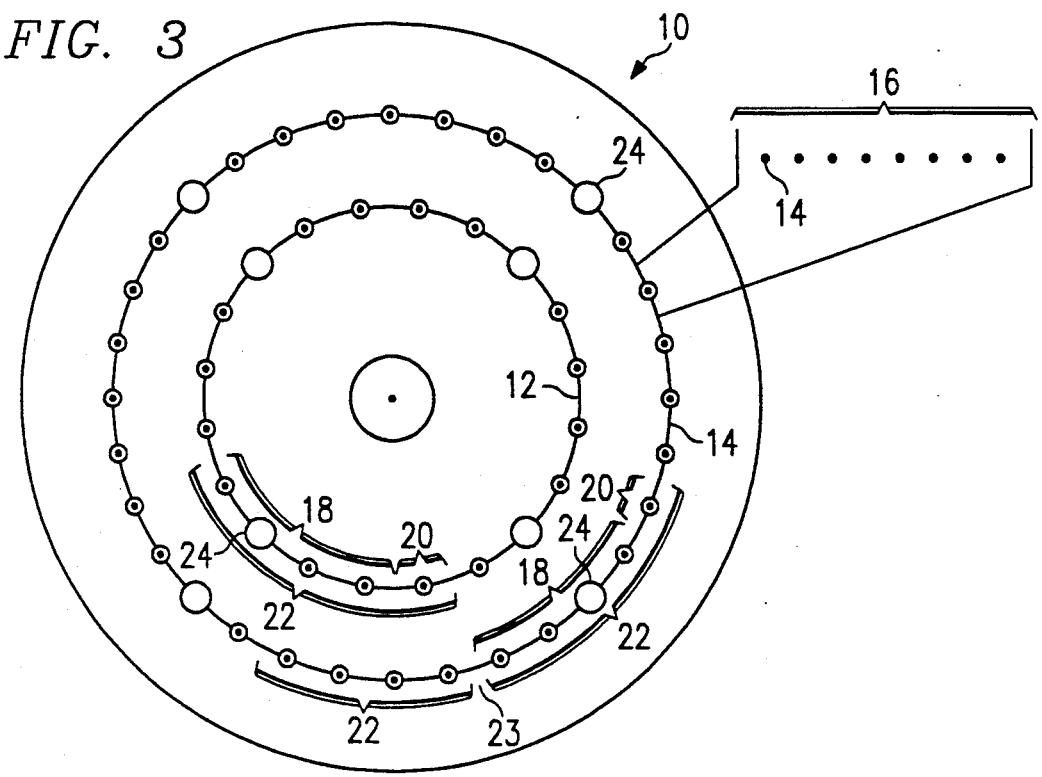
FIG. 3 illustrates a disk record carrier where the sector density remains substantially constant with increasing tack radius and the data fields are split by the servo fields that occur at substantially constant angular intervals from track to track.

With reference to FIG. 3, a preferred embodiment of the invention includes a disk 10 with a track format that is suitable for use with a MCAV disk system and also employs a constant frequency servo field. More specifically, the disk 10 includes a plurality of concentric tracks 12 where bits 14 of data are established on the tracks 12 at a density per unit length of track that remains substantially constant from track to track. The bits 14 are grouped into bytes 16, which are comprised of eight bits. A plurality of bytes 16 are grouped into a data field 18 that is used to store user data. Associated with each of the data fields is a header 20 that contains information that uniquely identifies the data field with which it is associated. The combination of a data field 18 and a header 20 comprise a sector 22. Gaps 23 separate the sectors on each track from one another as well as insure equal spacing of the sectors 22 on the track by accommodating deviations in the nominal length of the sector. Since the bits 14 have a substantially constant density from track to track, the bytes 16, data fields 18, headers 20 and sectors 22 also have a substantially constant density from track to track.

In an MCAV disk system, the disk 10 is rotated at a constant angular velocity. Consequently, the frequency at which the bits 14 on a track 12 are transferred to or from a read/write head varies according to the radius of the track over which the read/write head is positioned. More specifically, the frequency with which the bits 14 on a track are transferred to or from a R/W head positioned over the track 12 increases as the radius of the track 12 increases. Stated another way, more bits of data are transferred per unit of time between a R/W head and a track having a defined radius than are transferred between the R/W head and a track having a lesser radius than the defined radius.

The disk 10 also includes servo fields 24 that have a decreasing density per unit track length as the track radius increases. Preferably, the servo fields 24 are positioned at a substantially constant angular interval around a track that remains substantially constant from track to track. For example, the servo fields 24 shown in FIG. 3 are positioned every 90° around the tracks 12.

Since the disk 10 is rotated at a constant angular velocity when the MCAV disk system is in operation, the servo fields 24 pass under the R/W head at a frequency that remains substantially constant from track to track. Moreover, since the frequency of the sectors 22 varies from track to track and the frequency of the servo fields 24 remain substantially constant from track to track, the servo fields 24 generally split the sectors 22. Consequently, servo information is interspersed among the information contained in the user data fields 18 and the headers 20 thereby making it necessary to distinguish between the different fields or the information they contain when information is transferred to or from the disk 10. Moreover, the locations of the servo fields 24 within the sectors 22 varies in a substantially random manner.

To distinguish the servo fields 24 and the information they contain from the other fields in the sector and the information they contain, the headers 20 of each sector 22 are provided with a split count field 26 that provides information on the location of any servo field that splits the sector with respect to a defined point in the sector. Since the information in the split count fields 26 must be known before the occurrence of the servo field 24 that splits the sector 22, the split count fields only contain information on servo fields that occur after the headers 20 but before the end of the data fields 18. Generally, the servo fields 24 fall intermediate the starting and ending points of the data fields 18, which includes locations immediately preceding the first byte of data in the data field and immediately following the last byte of data in a data field. When the servo field 24 is located after the header 20, the split count field contains information that indicates the number of bytes that the servo field is from the beginning of the data field 18. Alternatively, other units of measure and/or other reference points within the sector can be utilized to specify the location of the servo field 24 within the data field. For example, the split count field could contain the number of bits or words that the servo field is located from the beginning of the header. If, however, a servo field falls within the header 20 of a sector 22, then the header 20 must be repositioned to a point preceding or following the servo field 24 so that the servo fields are detected at a substantially constant frequency when the disk 10 is rotated at a constant angular velocity.

In a preferred embodiment of the invention, the data fields 18 are 512 bytes in length. Consequently, the split count field is two bytes in length so that it can specify all of the possible locations of the servo field 24 with respect to the beginning of the data field 18. The header 20 in the preferred embodiment of the invention, also includes a two byte cylinder/track field 28, a one byte head field 30, a one byte sector number field 32, a one byte flag field 34, and a two byte cyclic redundancy check (CRC) field 36. The cylinder/track field 28 and the sector number field 32 are used to specify the location of a particular sector in a disk system that includes two or more disks. The flag field 34 is typically used to indicate various status information regarding the data contained in the data field 18. For example, the flag field 34 can be used to indicate that the data field 18 is defective or that the data contained in the data field 18 is "read-only" data. The CRC field 36 is used to detect errors that occur in transferring information to or from the data field 18.

FIG. 5 indicates the possible positions of the servo fields 24 on a track 12. Specifically, the servo field 24 associated with sector "M" is located intermediate the header 20 and the data field 18. With respect to sector "M+1," the servo field 24 splits the data field 18 into two sub-data fields. In sector "N," the servo field 24 occurs between the data field 18 and the gap 23 separating sector "N" from sector "N+1." Sector "N+1" is not split by a servo field 24. Rather, the servo field 24 is positioned in the gap 23 separating sector "N+1" from the subsequent sector.

Figure 6:
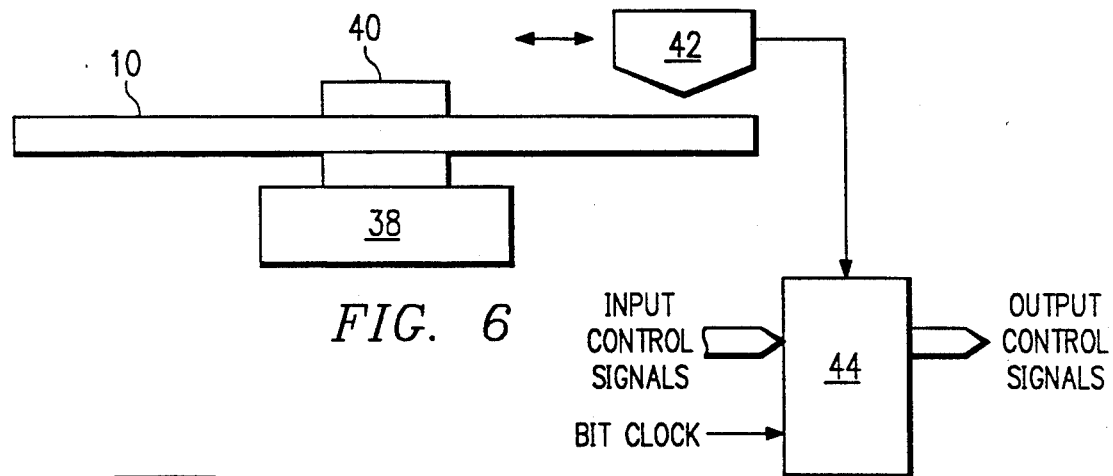
FIG. 6 illustrates a disk record carrier system with a disk controller that utilizes the split count information in the split count field to control the transfer of information to or from the disk.
Figure 4:
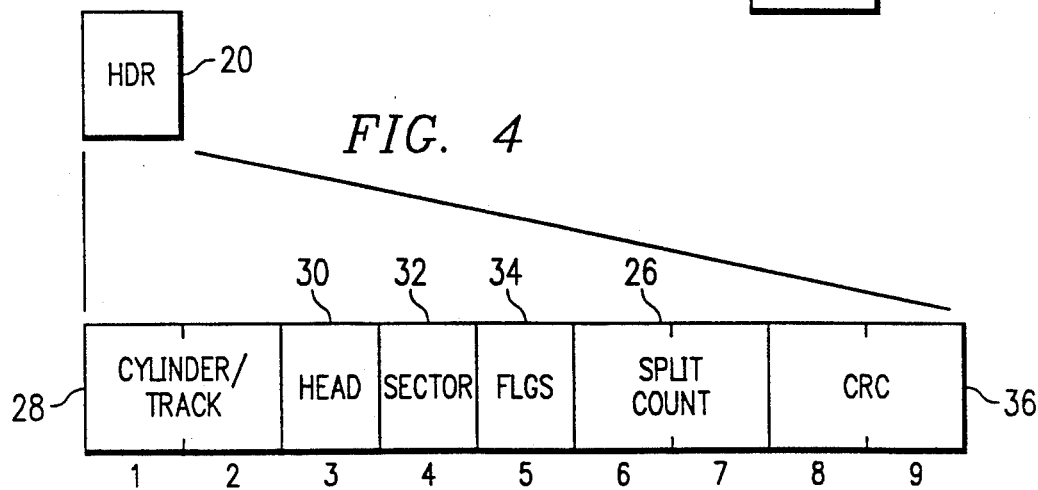
FIG. 4 illustrates the track format of the present invention and, in particular, the format of the header, which includes a split count field for indicating the number of bytes in the data field that precede or follow a servo field that splits the data field.

With reference to FIG. 6, the preferred embodiment of the invention also includes a motor 38 for rotating the disk 10, which is journaled to a spindle 40, at a constant angular velocity. Also included in the system is a read/write (R/W) head 42 for use in transferring information to and from the disk 10. The R/W head 42 is capable of being positioned over any one of the tracks 12 on the disk 10. Also included in the system is a disk controller 44 that controls the transfer of information to and from the disk 10 based upon a plurality of input control signals, which typically specify whether a read or write operation is to occur, and the split count information provided by the split count fields 26 via the R/W head 42. Based upon the split count information and the input control signals, the controller 44 generates a plurality of output control signals that cause the read, write, and/or servo circuities to perform the appropriate operations. Operation of the controller 44 is clocked at a rate that corresponds to the frequency with which bits on the disk are detected by the R/W head 42, which in MCAV disk systems increases with increasing track radius.

With reference to FIG. 7, the controller 44 includes a sequencer 46 that generates the appropriate output control signals for accomplishing a read, write, or servo operation based upon the input control signals and the split count information provided by the split count field 26 in the header 20 associated with the sector 22 to or from which data is to be transferred. The sequencer 46 processes the input control signals and the split count information according to a microprogram that is kept in a control store 48 and accessed by the sequencer 46 as needed. The controller 44 also includes a low split counter 50 and a high split counter 52 for holding the split count read from the split count fields 26. A deserializer 56 is included in the controller 44 for, among other things, converting the serial split count information read from the split count field 26 into bytes that are provided to the sequencer 46, the low split counter 52, and the high split counter 54.

In operation, data is transferred to or from the disk 10 by initially positioning the R/W head 42 over the appropriate track 12 on the disk 10. The sector 22 to or from which data is to be transferred is then located using the information provided by the cylinder/track field 28, the head field 30, and the sector number field 32. Once the appropriate sector is located, the information in the split count field 26 is provided to the deserializer 54 via the R/W head 42. The deserializer 54 converts the serial split count information into two parallel bytes that are provided to the sequencer 46. The sequencer 46, which is using the microprogram contained in the control store 58, identifies the information provided by the deserializer 54 as split count information and, in response, causes the low byte of the split count information to be loaded in the low split counter 50 using a "load split count low" signal. Similarly, the sequencer 46 causes the high byte of the split count information to be loaded in the high split counter 52 using a "load split count high" signal. After the split count information has been loaded into the low split counter 50 and the high split counter 52, the sequencer 46 waits for the data in the CRC field 36 to be processed. The time necessary to process the data contained in the CRC field 36 decreases as the radius of the tracks 12 increases due to the increasing frequency of the CRC fields 36 with increasing track radius. Once the data in the CRC field 36 has been processed, the sequencer 46 enables the low split counter 50 and the high split counter 52 using an "enable split count" signal. In response to the "enable split count" signal, the split count contained in the low split counter 50 and the high split counter 52 is decremented by one for every byte of data transferred from the data field 18 in the selected sector 22. More specifically, the count contained in the low split counter 50 and the high split counter 52 is decremented once during each period of a byte clock provided by the sequencer 46. The frequency of the byte clock varies according to the radius of the track to or from which data is being transferred. More specifically, the frequency of the byte clock increases as the radius of the track to or from which data is being transferred increases. When the split count expires, the high split counter 52 generates a "split count expired" signal that is provided to the sequencer 46. Upon receiving the "split count expired" signal, the sequencer causes the appropriate output control signals to be manipulated so that the information in the servo field 24 is not mistaken for user data or visa versa in the case of a read operation or, in the case of a write operation, user data is not written into the servo field 24 or visa versa. Following the processing of the servo field 24, the sequencer 46, which is capable of determining the remaining bytes in the data field based upon the defined length of the data field and/or the split count information provided by the deserializer 54, controls the transfer of information to or from the remaining portion of the data field 18.

The foregoing description of the invention has been presented for purposes of illustration and description. Further, the description is not intended to limit the invention to the form disclosed herein. Consequently, variations and modifications commensurate with the above teachings, and the skill or knowledge of the relevant art are within the scope of the present invention. For instance, the present invention can be used with a CAV disk system, a CLV disk system, and a CLV tape or drum system. The invention can also be used with different types of recording media, such as magnetic and optical media. Moreover, even though the described embodiment of the invention involved the splitting of a sector by a single servo field, the invention can be adapted to a track format where a field is split by two or more other fields. An embodiment of the invention where a processor calculates the split count or accesses a memory that contains the split count for each sector is also feasible. However, this embodiment is believed to have speed constraints that make it undesirable except in low speed applications. The preferred embodiment described hereinabove is further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the prior art.

What is claimed is:

1. A method for controlling the transfer of information from a data field that is split by a servo field, comprising:
   providing a disk comprising a plurality of tracks including a first track and a second track, each of said first and second tracks having a first portion that includes a header and a data field and a second portion that includes a servo field containing servo information for use in controlling the position of a transducer for reading and writing data in a data field, each of said first portions having a starting point and an ending point, said second portion of said first track located intermediate of said starting point and said ending point of said data field of said first track, said first track header including information relating to the location of said first track servo field, said first and second track servo fields being located at predetermined positions on said disk, said first track servo field occurring at a first frequency relative to said transducer used in reading said servo information contained in said first track servo field, said second portion of said second track located intermediate of said starting point and said ending point of said data field of said second track, said second track header including information related to the location of said second track servo field, said second track servo field occurring at a second frequency relative to said transducer for use in reading servo information contained in said servo field of said second track that is substantially equal to said first frequency;

reading said servo information from said servo field in said first track;

controlling said transducer to position said transducer relative to said first track using said servo information in said servo field of said first track;

transferring data relative to said data field of said first track;

reading said servo information from said servo field in said second track;

controlling said transducer to position said transducer relative to said second track using said servo information in said servo field of said second track; and transferring data relative to said data field of said second track.

2. A method, as claimed in claim 1, wherein:

said reading step includes rotating at least one of said disk and said transducer at a constant angular velocity relative to the other.

3. A method, as claimed in claim 1, wherein:

said providing step includes repositioning said first track header relative to said first track servo field when said predetermined position of said first track servo field is located within said first track header.

4. An apparatus for controlling the transfer of information on a disk relative to a data field on a disk that is split by a servo field having servo information, comprising:

a disk having a plurality of tracks, comprising:
  a first track including a first portion having a header and a data field and a second portion having a servo field containing servo information;
  a second track including a first portion having a header and a data field and a second portion having a servo field containing servo information;
  wherein said first portion of said first track has a starting point and an ending point and said second portion of said first track is located intermediate of said starting point and said ending point;
  wherein said first portion of said second track has a starting point and an ending point and said second portion of said second track is located intermediate of said starting point and said ending point;
  wherein each of said servo fields of said first and second tracks is predeterminedly positioned on said disk; and means for reading information from said disk, wherein said servo field associated with said first track occurs at a first frequency relative to said means for reading and said servo field associated with said second track occurs at a second frequency relative to said means for reading, with said second frequency being substantially equal to said first frequency and wherein said data field associated with said first track occurs at a first frequency relative to said means for reading and said data field associated with said second track occurs at a second frequency relative to said means for reading that is different from said first frequency.

5. An apparatus, as claimed in claim 4, wherein:

said header of said first track is repositioned relative to said servo field of said first track when said header encompasses at least a part of said predetermined positioned servo field of said first track.

* * * * *